(12) United States Patent
Karapetian

(10) Patent No.: US 6,407,323 B1
(45) Date of Patent: Jun. 18, 2002

(54) NOTATING SYSTEM FOR SYMBOLIZING DATA DESCRIPTIVE OF COMPOSED MUSIC

(75) Inventor: Karl Karapetian, 36110 Vargo St., Livonia, MI (US) 48152

(73) Assignees: Karl Karapetian; Aram Carl Karapetian, both of Livonia, MI (US)

(*) Notice: Subject to any disclaimer, the term of this patent is extended or adjusted under 35 U.S.C. 154(b) by 0 days.

(21) Appl. No.: 09/298,254

(22) Filed: Apr. 22, 1999

(51) Int. Cl.[7] .............................................. G09B 15/02
(52) U.S. Cl. .................... 84/477 R; 84/470 R; 84/483.2
(58) Field of Search ............................... 84/600, 470 R, 84/471 R, 477 R, 483.1, 483.2, DIG. 6

(56) References Cited

U.S. PATENT DOCUMENTS

| | | | |
|---|---|---|---|
| 3,680,428 A | 8/1972 | Buckrucker et al. | 84/471 |
| 3,698,277 A | 10/1972 | Barra | 84/483 |
| 5,202,526 A | 4/1993 | Ohya | 84/462 |
| 5,540,132 A | 7/1996 | Hale | 84/470 |
| 5,775,915 A | 7/1998 | Quinn | 434/156 |
| 5,931,680 A * | 8/1999 | Semba | 84/477 R |
| 6,124,540 A * | 9/2000 | Lotito | 84/483.2 |
| 6,188,010 B1 * | 2/2001 | Iwamura | 84/609 |
| 6,211,451 B1 * | 4/2001 | Tohgi et al. | 84/470 R |
| 6,271,453 B1 * | 8/2001 | Hacker | 84/470 R |

* cited by examiner

Primary Examiner—Marlon T. Fletcher
(74) Attorney, Agent, or Firm—Gifford, Krass, Groh, Sprinkle, Anderson & Citkowski, P.C.

(57) ABSTRACT

A visual display for graphically symbolizing melodic increments of composed music includes composite designators, each of which represent a melodic increment in the musical composition. Each of the designators includes a first visual indicator which is selected from a first class of visual images. Each member of this first class of visual images corresponds to a different theme of the musical composition. Each composite designator also includes a second visual indicator which is selected from a second class of images. Each member of the second class of images corresponds to an ordering. Each composite designator represents a melodic increment having a specific theme and ordering.

21 Claims, 2 Drawing Sheets

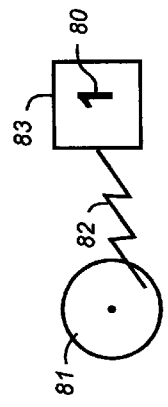
Fig - 6
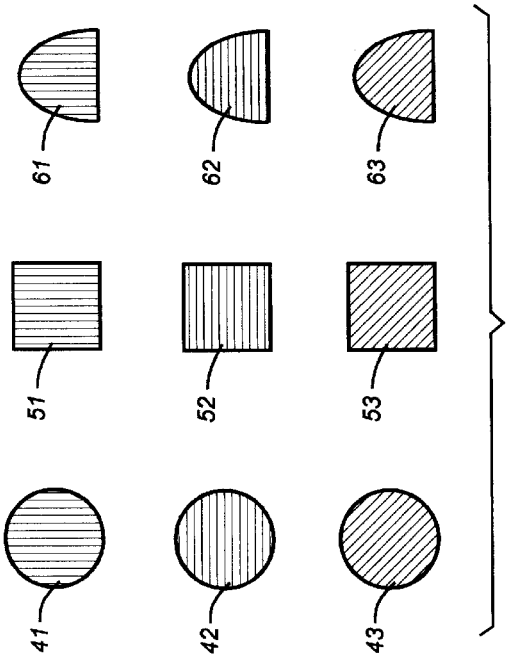
Fig - 3
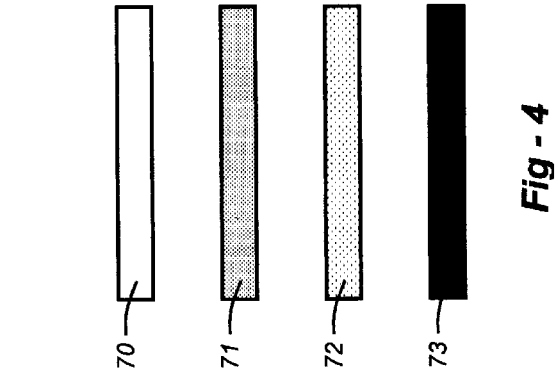
Fig - 4
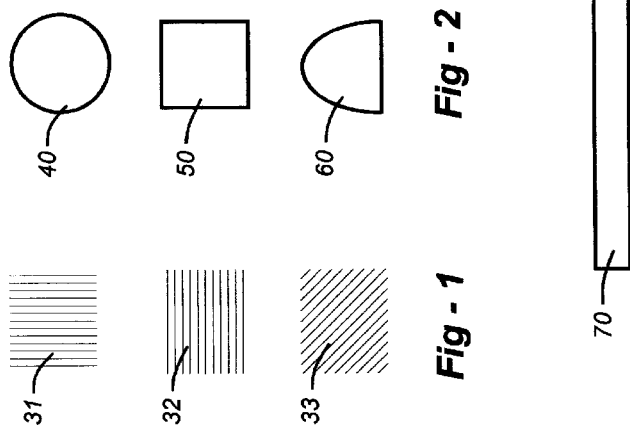
Fig - 2
Fig - 1

US 6,407,323 B1

NOTATING SYSTEM FOR SYMBOLIZING DATA DESCRIPTIVE OF COMPOSED MUSIC

FIELD OF INVENTION

This invention relates generally to the field of communications and, more specifically, to a system for symbolizing data that is descriptive of composed music.

BACKGROUND

I. SUBJECT MATTER CLASSIFICATIONS OF CLASSICAL MUSIC COMPOSITIONS

The following specification includes many terms that have specific meanings in the field of musical composition, as well as a few terms that have specific meanings for purposes of this invention. In order to prevent confusion as to the meaning of these terms, a glossary is included at the end of the specification, just prior to the claims.

A music composition comprises a body of organized tonalities. The particular tonalities of a composition and the sequence in which they occur reveal its "subject matter." This subject matter may comprise one or more musical "subjects," each subject formally referred to by the descriptor "theme." It is helpful to think of a theme as a single musical statement whose tonalities comprise one or more melodic increments. An example of a single melody—and perhaps the one most commonly recognized throughout the United States—is embodied in the song "Happy Birthday to You." The tonalities comprising the entirety of this musical composition express a single musical subject (or theme) within a single melodic increment.

The subject matter of most classical compositions, however, is expressive of a plurality of themes. But irrespective of the number of themes embodied in a musical composition, each melody whose tonalities relate to a given theme is referred to as a "melodic increment."

It is often desirable to identify individual melodic increments within a piece of music and to describe whether each increment is part of certain theme or a transition. This identification and description can be used in the study and enjoyment of music. A formal description of each melodic increment indicates whether the increment is a "part" of a "theme" or a "transition."

In a formal description, a melodic increment whose sole purpose is intended by the composer to express melodic content related to a specific theme is referred to as a "part" of a theme. Following the descriptor "part" is a cardinal numeral, such as "one" or "1"; "two" or "2". It should be noted that the convention is that when the subject matter of a composition reveals only one theme, each melodic increment whose tonalities reveal or reiterate that theme in some variation is called "part one" even though there is no other part. The same is true when a given theme of a plurality of themes presented in a composition comprises only a single melody.

A full formal description of a melodic increment whose sole purpose is to express or help to express a given theme is described by four descriptors. Using the formal description "theme one, part one" as an example, the descriptors are as follows:

the first is "theme";

the second is a cardinal numeral which is used to label the number of the theme, as in "one" of "theme one";

the third is "part"; and is used to designate subject matter pertaining to a particular melodic unit;

the fourth, like the second, is also a cardinal numeral; and is used to designate the number of the part, as in "one" of "part one."

In addition to those melodic increments whose sole purpose is to express or help to express a given theme, a composition often has one or more melodic increments whose purpose is to link or bridge the subject matter of one melodic increment to another. Such an increment is referred to by the descriptor "transition."

Summarily, the tonal substance of a given melodic increment either:

helps to express the subject matter of a given theme; or expresses the entire subject matter of a given theme; or serves as a transition to link previously expressed subject matter to subject matter that is to follow.

II. ARCHITECTURE OF CLASSICAL MUSIC COMPOSITIONS

As is true of every architectural achievement, music composition may be described according to its structural features. The organization of musical sound as composition is set forth in print in a work called a "score." A score includes both music notation as well as certain verbal indicators which relate to expression and style of performance. By analogy, a score is to music performance as a set of blueprints is to the erection of a building. From an architectural point of view:

the score of a classical composition indicates its structural and aesthetic components by the use of musical notation and verbal description;

music notation documents tonal pitch, the duration of individual tones, and how each tone is to be articulated;

the notes comprising the whole of a composition are organized into a plurality of musical notations called "measures";

a particular plurality of sequential measures comprises a fundamental musical unit referred to as a "melodic increment," and each melodic increment is considered to be a fundamental architectural component of the structure of a composition;

melodic increments of a composition form component architectonic units, each comprising one or more melodic increments;

one or more architectonic units form a major section of a composition;

the totality of the major sections in a given score represents the entirety of that musical composition.

A. Major Sections and Musical Subject Matter

The melody or plurality of melodies embodied in a given musical composition is generally referred to as its "subject matter." The subject matter of a composition may comprise one or more subjects, each of which is referred to as a "theme." Regardless of the number of themes, this subject matter is generally presented, developed, and resolved within the broad architectural confines of one of the traditional musical "forms." By analogy, a musical form is like a generic blueprint that indicates the general framework of a given style of home, such as a ranch, hacienda, or Tudor.

B. Major Sections

The melodic subject matter of a classical composition is presented in one or more major sections. Taken as a whole, classical compositions commonly have either one, two, or three major sections. For example, most first and fourth movements in symphonic music have three major sections. Because of the broad spectrum of architectural forms which composers of classical compositions have used, it is necessary to confine our remarks in this disclosure to one of the most important, as well as popular, forms, the "sonata allegro," which has three major sections: "exposition," "development," and "recapitulation."

Each major section of the sonata allegro form comprises one or more architectonic units, each unit comprising one or more melodic increments. The totality of the music included in these increments constitutes the musical subject matter of the composition.

The subject matter of the first major section, the exposition, comprises one or more themes. An exposition also typically includes a special section called a "closing section" whose purpose is to conclude or close the music contained in the exposition.

The second major section of the sonata allegro form is the development section. In this section the composer typically selects subject matter first introduced in the exposition and further develops that subject matter.

The third major section is the recapitulation section. This section includes certain material first presented in the exposition. The recapitulation also typically includes a closing section. Following this closing section is a section called the "coda," or "finale," which is also categorized as a special section. The music in the finale brings the musical composition to its conclusion.

III. PRIOR APPROACHES TO NOTATING MUSIC FOR INSTRUCTION

Knowledge of music architecture and subject matter contributes significantly to increased appreciation of classical music. For hundreds of years instructors have attempted to explain to music enthusiasts the fundamental features of music subject matter and architecture. Because of the aural nature of music, modern instructors have regularly presented the information in two phases.

In phase one the instructor introduces and attempts to explain fundamental musical terms used for categorizing the formal musical components of a composition. In phase two the instructor attempts to help learners comprehend the meaning of these terms as they apply to actual music.

A typical approach instructors use for attaining this goal is to associate each term with an example or series of examples that illustrate its use. This approach comprises:

employing a recording of a "model" classical composition, such as a portion of Mozart's well-known first movement of his fortieth symphony; and in the midst of the play of that recording, visually and vocally identifying the verbal terms used to describe sequentially occurring melodic increments of the model composition.

Instructors differ in the manner in which they visually present the formal descriptions of melodic increments. Some instructors prepare and display these descriptions in advance of the play of the recording of the model composition; other instructors display in writing these formal descriptions during the play of the recording. In the latter instance, instructors begin writing each appropriate description at the moment each melodic increment of the performed composition is aurally perceived.

When using such a visual aide it is understood that a viewer knows the significance of the following abbreviations pertaining to the following musical terms:

C Coda
cl. s. closing section
p. part
th. theme
tr. transition.

These abbreviations can be used along with numerals and punctuation to provide formal descriptions. The following formats are examples describing Mozart's Symphony No. 40, G minor, 1st Movement)

Format A:
Exposition (or "Expo.")
th. 1, p. 1; th. 1, p. 1; th. 1, p. 2; tr.; th. 2, p. 1; th. 2, p. 1; tr. cl. s.: th. 1, p. 1; th. 1, p. 1; th. 3, p. 1; th. 3, p. 2.
Development (or "Dev.")
th. 1, p. 1; th. 1, p. 1; th. 1, p. 1; tr.
Recapitulation (or "Recap.")
th, 1, p. 1; th. 1, p. 1; th. 1, p. 2; tr.; th. 2, p. 1; th. 2, p. 1; th. 2, p. 1; tr. cl. s.: th. 1, p. 1: th. 1, p. 1; th. 3, p. 1; C.: th. 1, p. 1.

Format B:
Exposition (or "Expo.")
th 1 p 1; th 1 p 1; th 1 p 2; tr.: th 2 p 1; th 2 p 1; tr. cl s: th 1 p 1: th 1 p 1; th 3 p 1; th 3 p 2.
Development (or "Dev.")
th 1 p 1; th 1 p 1; th 1 p 1; tr.
Recapitulation (or "Recap.")
th 1 p 1; th 1 p 1; th 1 p 2; tr; th 2p 1; th 2p 1; tr. cl s: th 1 p 1: th 1 p 1; th 3p 1; C: th 1 p 1.

Format C:
Exposition (or "Expo.") th 1 p 1 th 1 p 1 th 1 p 2 tr th 2 p 1 th 2 p 1 tr cl s th 1 p 1 th 1 p 1 th 3 p 1 th 3 p 2.
Development (or "Dev.")
th 1 p 1 th 1 p 1 th 1 p 1 tr.
Recapitulation (or "Recap.")
th 1 p 1 th 1 p 1 th 1 p 2 tr th 2 p 1 th 2 p 1 tr cl s th 1 p 1 th 1 p 1 th 3 p 1 C th 1 p 1.

In each of the formats above, "A," "B," and "C," each abbreviation and each numeral serves as a visual indicator of a particular descriptor used for formally categorizing a given melodic increment of the model composition. The significant visual difference between and among these formats is the degree to which punctuation is used. Format A includes formal punctuation, Format B includes minimal punctuation, and Format C includes no punctuation.

As may be observed, regardless of the degree to which punctuation is used, each format contains a mass of abbreviations and numerals, the totality of which is used to visually portray each formal description pertinent to each melodic increment embodied in a composition. The purpose of these visual indicators is to identify the occurrence of and to describe each melodic increment within a composition. The following explains the use of descriptors and punctuation used for describing the first melodic increment in Format A.

The first increment descriptor in the composite description, line one, is "th. 1, p. 1;". This description contains five visual indicators, each for identifying a discrete datum. The first visual indicator is the abbreviation "th." The second is the numeral one ("1"), which is followed by a comma. This comma serves as a standard punctuation mark used to divide items in a series. The third visual indicator is the abbreviation "p." The fourth is also a "1". The fifth visual indicator comprising this descriptor is a dual-purpose semicolon ";". First, it indicates the end of a subject matter description. And secondly, it denotes the end of a melodic increment. Together, then, these five visual indicators are needed to denote that the musical subject matter embodied in the first melodic increment of the composition described is "theme one, part one."

As may be seen in the example, the verbal descriptors used for identifying themes and special sections of a composition are presented sequentially. The descriptors are shown either in a single line, as shown in the example, or are arbitrarily divided without regard to the content represented in each line. As a result, the learner has difficulty organizing into groups the descriptors used for identifying each separate melodic increment and each special section.

The general format for instruction used in the present art for teaching select aspects of performed music comprises:
  introducing select music descriptors as labels for select music data;
  using these descriptors to illustrate the select data of a given composition; and
  verbally coordinating the application of select data during performance of a given composition.

The process of verbally coordinating illustrations of select data during performances to help synchronize music and data meaningfully to listeners is a step in the right direction, though primitive.

Illustrated documentation of music descriptors used in the prior art is defective because of the confusion that results from the manner of its visual presentation in its attempt to:
  depict the subject matter and architectural structure of classical music;
  identify melodic increments according to:
    the numerical hierarchy of each theme, such as theme one, theme two, etc.
    the melodic number assigned to a given melodic part of a given theme, as "one" in "part one";
  represent the:
    overall structure of a given composition;
    internal structure of each of its major sections, i.e., exposition, development, recapitulation;
    component melodic increments of each architectonic unit within a given major section;
    thematic description of each melodic increment;
    frequency and sequence of each melodic increment having the same thematic description;
    presence of and description of special sections, e.g., closing, development, and coda.

Further, the present art lacks a means for inaudibly associating a description of a melodic increment with an audible performance of music appertaining to that description.

SUMMARY OF THE INVENTION

The present invention overcomes many of the shortcomings of the prior art by providing a visual display for graphically symbolizing melodic increments of composed music. The visual display includes a plurality of composite designators, each of which represent a melodic increment of the musical composition. Each composite designator comprises a first visual indicator which is selected from a first class of visual images. Each member of this first class of visual images corresponds to a different theme of the musical composition. The composite designators further comprise a second visual indicator which is selected from a second class of images. Each member of the second class of images corresponds to an ordering. Each composite designator therefor represents a melodic increment having a specific theme and ordering. The present invention also provides a method for providing a graphical representation of a sequence of melodic increments in a musical composition which may be grouped into architectonic rows, as well as a notating system.

BRIEF DESCRIPTION OF THE DRAWINGS

In the drawings, closely related figures have the same number but different alphabetic suffixes.

FIGS. 1–4 show various solitary images, each having a novel use in the invention;

FIG. 1 shows three simple solitary images, each of which is a type of hatching distinguished by its discrete linear orientation;

FIG. 2 shows three simple solitary images, each of which is a type of geometric figure distinguished by its discrete outline;

FIG. 3 shows nine composite solitary images, each substantially composed of a given type of hatching of FIG. 1 and a given type of geometric figure of FIG. 2;

FIG. 4 shows four solitary images: one simple solitary image, and three composite solitary images, each of which is a type of horizontal bar distinguished by its degree of shading;

FIG. 6 schematically represents an audible performance of music during which an inaudible electronic signal is employed for effecting a visual appearance on a receiver-monitor of a predetermined standard reference indicium at the moment a given musical increment begins.

DETAILED DESCRIPTION OF THE PREFERRED EMBODIMENTS

Figure 5:
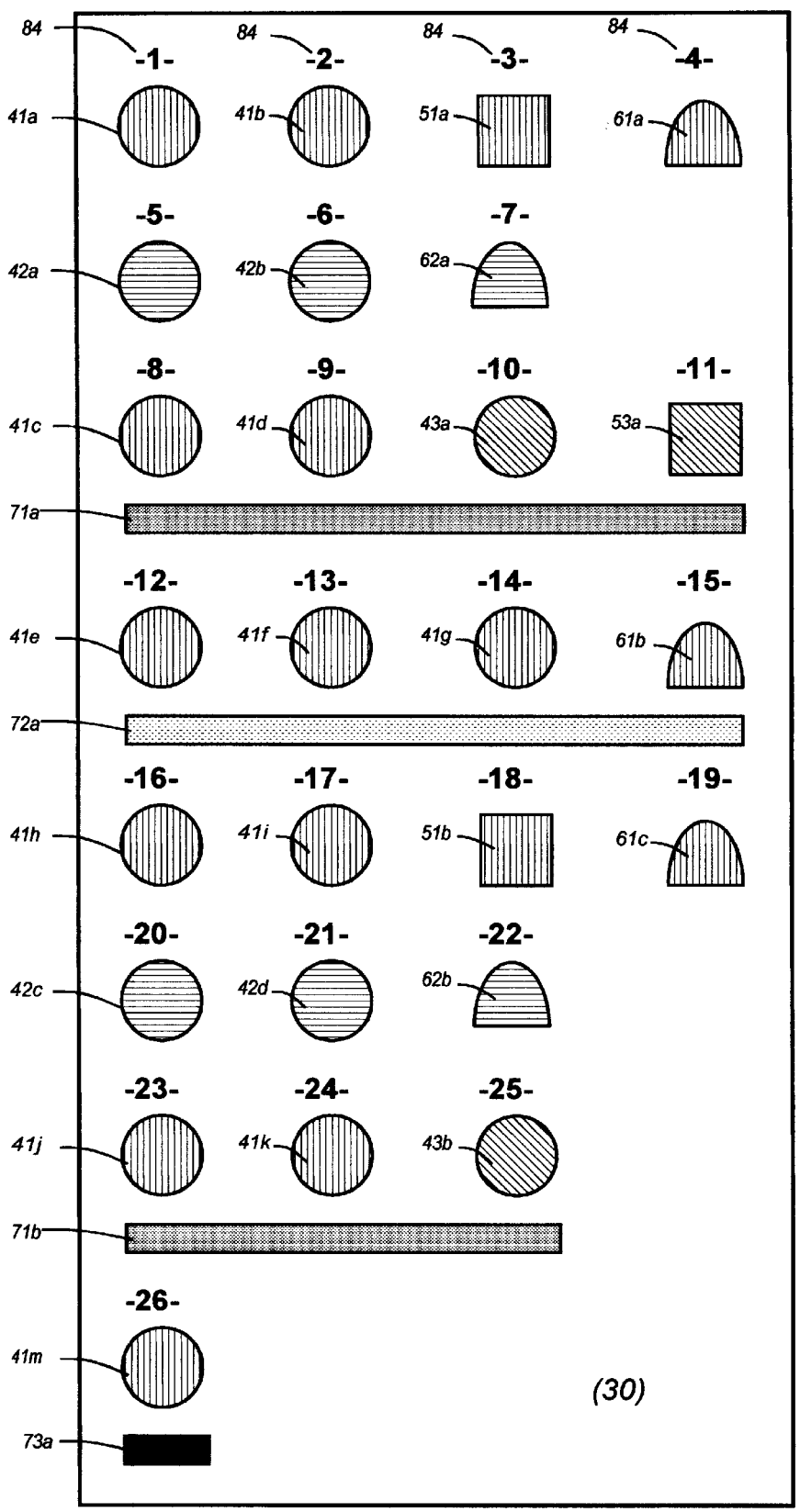
FIG. 5 shows a preferred embodiment of the invention when representing select data descriptive of a model composition.

FIG. 1 shows a plurality of simple solitary images 31, 32, and 33, each of which consists of parallel lines. This generic property serves as a logical basis for categorizing each member as belonging to a specific class of images, i.e., hatchings. In addition to the same generic property, each composite solitary image 31, 32, and 33 also has a readily apparent visual property that distinguishes it; namely a discrete type of hatching. Specifically, the hatching of image 31 is vertical, the hatching of image 32 is horizontal, and the hatching of image 33 is diagonal.

FIG. 2 shows a plurality of simple solitary images 40, 50, and 60, each having the generic property of geometric outline. This generic property serves as a logical basis for categorizing each member as belonging to a specific class of images, i.e., geometric outlines. In addition to the same generic property, each composite solitary image 40, 50, and 60 also has a readily apparent visual property that distinguishes it; namely, a discrete type of geometric outline. Specifically, the geometric outline of image 40 is circular, the type of geometric outline of image 50 is rectangular, and the type of geometric outline of image 60 is semi-ovalar. These types of geometric outlines are more commonly referred to as follows: circle 40, rectangle 50, and semi-oval 60.

FIG. 3 shows a plurality of composite solitary images 41, 42, 43, 51, 52, 53, 61, 62, and 63, each of which substantially manifests a combination of two generic visual properties: hatching 31, 32, or 33 of FIG. 1 and geometric outline 40, 50 or 60 of FIG. 2.

FIG. 4 shows a simple solitary image 70 used to represent a horizontal bar whose distinguishing property is that of unitary horizontal lineation, and a plurality of composite solitary images 71, 72, and 73, each of which has the generic property of simple solitary image 70. This generic property serves as a logical basis for categorizing each member 71, 72, and 73 as belonging to a specific class of images, i.e., horizontal bars.

In addition to manifesting the same generic property, each composite solitary image 71, 72, and 73 also has a readily apparent visual property that distinguishes it; namely a discrete type or degree of shading. Specifically, the type of shading of image 71 is medium, the type of shading of image 72 is light, and the type of shading of image 73 is solid.

A predetermined generic visual property of a graphic image serves as a logical basis for classifying a plurality of solitary images as members of a given class or category of images. This generic property is designated as a visual indicator. Accordingly, each generic property, e.g., hatching, geometric outline, and unitary horizontal lineation, is a visual indicator. Likewise, each previously designated visual property used to distinguish members of a given class of images is also designated as a visual indicator. Accordingly, each discrete type of hatching 31, 32, and 33 of FIG. 1 and each discrete type of geometric design 40, 50, and 60 of FIG. 2 and each discrete type of horizontal bar 71, 72, and 73 of FIG. 4 is a visual indicator. Thus, each composite solitary image 41, 42, 43, 51, 52, 53, 61, 62, and 63, is a notational symbol, and each manifests the generic visual properties of each of the simple solitary images of FIGS. 1 and 2 as well as a discrete type of visual properties belonging to each generic property.

FIG. 5 illustrates a preferred embodiment of the notating means of the invention. This embodiment represents select data descriptive of a model composition, i.e., Wolfgang Amadeus Mozart's Symphony No. 40 in g minor, First Movement. This illustration is to be viewed as representative of both a portable apparatus as well as a visual depiction as may be presented in whole or in part through the instrumentality of a technology-based viewing means, or display, such as a TV screen or computer monitor. A preferred embodiment is organized so as to be viewed as a schematic whose composite solitary images are shown against a contrasting background 30, and sequentially arranged in rows, each row comprising a component architectonic unit referred to as a "linear area." Each composite solitary image shown in a linear area is categorized either as an increment designator or as a special section designator according to the kind of information it is used to represent. The composite solitary images are also referred to herein as composite designators.

Certain kinds of composite solitary images are repeated. FIG. 5, therefore, differentiates individual occurrences of the same kind of composite solitary image by using the corresponding numeral as given in FIGS. 3 and 4 but with different alphabetic suffixes. The table below identifies in column one the reference indicia used in FIGS. 3 and 4 for identifying each of the exemplary composite visual indicators. In column two it identifies the numeric-alphabetic reference indicia used in FIG. 5 and corresponding to those indicia of FIGS. 3 and 4 which are employed in FIG. 5. Because the model composition does not require the use of composite solitary images 52 and 63, these do not appear in FIG. 5. In column three, under "Class," it identifies the generic visual indicators manifested by each composite solitary image. And, in column four it identifies each specific type of visual indicator manifested by each composite solitary image.

| Visual Indicators Manifested in Each Composite Image of FIGS. 3, 4, and 5 | | | |
|---|---|---|---|
| Disclosure Reference | | | |
| FIG. 3 | FIG. 5 | Class | Type |
| 41 | 41a–k, 41m | geometric outline hatching | circle vertical |
| 42 | 42a–d | geometric outline hatching | circle horizontal |
| 43 | 43a–b | geometric outline hatching | circle diagonal |
| 51 | 51a–b | geometric outline hatching | rectangle vertical |
| 52 | — | geometric outline hatching | rectangle horizontal |
| 53 | 53a | geometric outline hatching | rectangle diagonal |
| 61 | 61a–c | geometric outline hatching | semi-oval vertical |
| 62 | 62a–b | geometric outline hatching | semi-oval horizontal |
| 63 | — | geometric outline hatching | semi-oval diagonal |
| 70 | — | horizontal bar shading | none |
| 71 | 71a–b | horizontal bar shading | medium |
| 72 | 72a | horizontal bar shading | light |
| 73 | 73a | horizontal bar shading | solid |

The following table identifies each linear area depicted in FIG. 5. It also shows:
- the composite solitary image(s) included in each linear area;
- the composite solitary images referred to as increment designators;
- the composite solitary images referred to as special section designators; and
- the locative disposition of each special section designator in relationship to its upwardly adjacent increment designator(s).

| Linear Area | Composite Solitary Images |
|---|---|
| Row One: | 41a, 41b, 51a, and 61a, each an increment designator; |
| Row Two: | 42a, 42b, and 62a, each an increment designator, |
| Row Three: | 41c, 41d, 43a, and 53a, each an increment designator, and horizontal bar 71a, a special section designator disposed beneath these increment designators; |
| Row Four: | 41e, 41f, 41g, and 61b, each an increment designator, and horizontal bar 72a, a special section designator disposed beneath these increment designators; |
| Row Five: | 41h, 41i, 51b, and 61c, each an increment designator; |
| Row Six: | 42e, 42d, and 62b, each an increment designator; |
| Row Seven: | 41j, 41k, and 43b, each an increment designator, and horizontal bar 71b, a special section designator disposed beneath these increment designators; |
| Row Eight: | 41m, an increment designator, and horizontal bar 73a, a special section designator disposed beneath this increment designator. |

FIG. 5 also includes a series of sequentially-ordinate numeric reference indicia or index numeral. Each indicium or index numeral is associated with and appears above a corresponding sequentially-ordinate appearance of an increment designator 41*a*, 41*b*, 51*a*, 61*a*, 42*a*, 42*b*, 62*a*, 41*c*, 41*d*, 43*a*, 53*a*, 41*e*, 61*b*, 41*h*, 41*i*, 51*b*, 61*c*, 42*c*, 42*d*, 62*b*, 41*j*, 41*k*, 43*b*, and 41*m*.

FIG. 6 illustrates a pictorial diagram of a scenario representing a live or pre-recorded audible performance of music, represented by circle 81, during which an inaudible signal, represented by zig-zag line 82, is employed for effecting a visual appearance of a predetermined reference indicium 80 on a "receiver-monitor," e.g., a screen or electronic numbering display 83 at the moment a given increment begins.

Because of the nature of the notating system, it is necessary that certain explanations and illustrations in this disclosure be made in reference to a particular "model" musical composition. The composition chosen is Wolfgang Amadeus Mozart's Symphony No. 40 in G minor, First Movement. This model composition is selected because its three-part sonata allegro form is generally recognized by musicologists as being one of the most important architectural formats for the presentation of a formal composition.

As indicated previously, the totality of the tonal content of a formally structured composition may be divided into its component melodic increments. A composite solitary image 41, 42, 43, 51, 52, 53, 61, 62, and 63, each a notational symbol called an "increment designator," is used to represent component verbal descriptors used for formally describing a given melodic increment embodied in a musical composition. These composite solitary images are also referred to herein as composite designators.

The descriptor "theme" is generic and is regularly used as the leading descriptor of a more complete formal description of the tonal content of a melodic increment. This descriptor regularly precedes a cardinal numeral, the latter descriptor for categorizing thematic subject matter of a melodic increment according to the theme to which it belongs, e.g., "theme one," "theme two."

Each composite increment designator comprises a plurality of solitary images, with each solitary image being a visual indicator predesignated for representing a given descriptor used in a formal description of a given melodic increment.

The individual melodic increments comprising the model composition are indicated by this disclosure's numeric reference indicia used for identifying composite solitary images 41, 42, 43, 51, 42, 53, 61, 62, and 63, which are referred to hereafter as increment designators or composite designators. Each increment designator both represents the existence within a composition of a melodic increment as well as a formal description of that increment. As indicated previously, such a formal description comprises a plurality of verbal descriptors.

Each increment designator comprises multiple component solitary images, and may therefore be mentally divided into these component solitary images. Each of these component solitary images is a visual indicator predesignated for representing a given descriptor used in a formal description of a given melodic increment. In the preferred use of the invention, a user is provided a visual explanation which:

shows each solitary image used as a visual indicator;

identifies the signification attributed to each visual indicator;

shows each type of composite solitary image, or increment designator; and identifies the formal description denoted by each type of increment designator.

For purposes of this disclosure, the generic property of hatching as manifested by each simple solitary image of FIG. 1 has been arbitrarily chosen as a visual indicator for representing the verbal descriptor "theme". Each discrete type of hatching 31, 32, 33 of FIG. 1 has been arbitrarily chosen as a visual indicator for representing a discrete cardinal numeral descriptor used for formally categorizing thematic subject matter of a melodic increment according to the discrete theme to which it belongs. The predetermined signification of the combined use of the generic property of hatching along with each discrete type of hatching 31, 32, 33 of FIG. 1 is as follows:

hatching and vertical hatching 31 is manifested in increment designators 41, 51, and 61 for respectively denoting the descriptors "theme one";

hatching and horizontal hatching 32 is manifested in increment designators 42, 52, and 62 for respectively denoting the descriptors "theme two"; and hatching and diagonal hatching 33 is manifested in increment designators 43, 53, and 63 for respectively denoting the descriptors "theme three."

In addition to being categorized as belonging to a given theme, the subject matter of a melodic increment is also categorized either as belonging to a particular "part" of a theme or as a "transition." Accordingly, for purposes of this disclosure, the generic property of geometric outline as manifested by each simple solitary image of FIG. 2 has been arbitrarily chosen as a visual indicator for representing one or the other of these verbal descriptors. Each type of geometric outline 40, 50, and 60 of FIG. 2 manifested by each increment designator of FIG. 3 serves as a visual indicator for denoting an occurrence of either a given part (of a theme) or of a transition, as follows: circle 40 as manifested in increment designator 41, 42, and 43 denotes an occurrence of part one (of a theme); rectangle 50 as manifested in designator 51, 52, and 53 denotes an occurrence of part two (of a theme); and semi-oval 60 as manifested in designator 61, 62, and 63 denotes an occurrence of a transition. To avoid confusion, the visual indicator representing whether an increment is a part or a transition is generally referred to as indicating or corresponding to an ordering. That is, the visual indicator, geometric outline in the present example, corresponds to the ordering of the increment. Ordering refers to whether the melodic increment is a first part, second part, transition, or some other "order" necessary for describing a given melodic increment.

Each composite increment designator, then, is a notational symbol used concurrently for indicating the occurrence of an increment, for identifying the subject matter of an increment either as a particular part of a theme or as a transitional passage, and for describing the musical subject matter according to theme number. The numeric-alphabetic indicia used in this disclosure for referencing the increment designators employed in the schematic of FIG. 5 and the significance of each said notational symbol referred to are as follows:

41 *a–k* and 41*m* for denoting an occurrence of theme one, part one;

42*a–d* for denoting an occurrence of theme two, part one;

43*a–b* for denoting an occurrence of theme three, part one;

51*a–b* for denoting an occurrence of theme one, part two;

53*a* for denoting the occurrence of theme three, part two;

61*a–c* for denoting the occurrence of theme one in a transition; and

62*a–b* for denoting the occurrence of theme two in a transition.

Turning now to the horizontal bars of FIG. 4., horizontal bar 70 is a single solitary image. Incorporated along with horizontal bar 70 is another single solitary image, namely, a discrete type or degree of shading, as shown in horizontal bars 71, 72, and 73. Each discrete type of shading incorporated in a horizontal bar serves as a visual indicator for denoting an occurrence of a discrete type of special section, as follows: medium shading manifested in horizontal bar 71 is a visual indicator for denoting an occurrence of a special section designated as a "closing section"; light shading manifested in horizontal bar 72 is a visual indicator for denoting an occurrence of a special section designated as a "development section"; and solid shading manifested in horizontal bar 73 is a visual indicator for denoting an occurrence of a special section designated as "coda" or "finale." The bars 70, 71, 72 and 73 are referred to in the claims as section designators.

Certain linear areas of formally structured compositions, such as the model composition, are categorized as special sections. The standard term for special sections are introduction, closing section, development section, and finale or coda. The model composition includes only the latter three types, i.e., closing, development, and finale. The term applied to a given special section depends upon the nature of its musical content and its relative location within the target composition. The number of increments included in the various special sections often vary. Horizontal bar 70 of FIG. 3, when disposed beneath some upwardly adjacent increment designator(s), is used for denoting the presence of a special section and that it includes the musical content represented by the increment designator(s) underscored by that horizontal bar. Therefore, each section designator is associated with one or more successive ones of the composite increment designators.

Each composite solitary image 71, 72, and 73 is referred to as "special section designator" and each serves as a notational symbol for concurrently indicating: the relative location of a special section within a target composition; the particular type of special section being identified; and the number of increments included in a given special section. The length of each horizontal bar as illustrated at 71, 72, and 73 is only representative.

Each discrete type or degree of shading of a horizontal bar, as at 71, 72, and 73 of FIG. 4 and at 71*a*, 72*a*, 71*b*, and 73*a* of FIG. 5, is used for signifying each discrete type of special section, as follows: medium shading 71 (FIG. 3) as at 71*a* and 71*b* of FIG. 5, is used for identifying a closing section; light shading 72 (FIG. 3), as at 72*a* of FIG. 5, for identifying a development section; and solid shading 73 (FIG. 3), as at 73*a* of FIG. 5, for identifying a finale.

As may be seen in FIG. 5 the actual length of a given horizontal bar must be appropriate to the number of increments included in a given special section, as illustrated by special section designators 71*a*, 72*a*, 71*b*, and 73*a* of FIG. 5.

In the schematic of FIG. 5, the numeric-alphabetic indicia employed for referencing the notational symbols classified as special section designators, as well as the significance assigned to the individual special section designators, are as follows:

special section designator 71*a* is used for indicating that the architectonic unit comprising increment designators 41*c*, 41*d*, 43*a*, and 53*a* represents the musical content in a closing section;

special section designator 72*a* is used for indicating that the architectonic unit comprising increment designators 41*e*, 41*f*, 41*g*, and 61*b* represents the musical content in the development section;

special section designator 71*b* is used for indicating that the architectonic unit comprising increment designators 41*j*, 41*k*, and 43*b* represents the musical content in a closing section; and special section designator 73*a* is used for indicating that the architectonic unit comprising increment designator 41*m* represents the musical content in a finale, or coda.

Reference Indicia Used with Invention

The numeric-alphabetic indicia or index numerals 84 are used in the disclosure for referencing the plurality of sequentially ordinate reference indicia as used in the invention, i.e., "1," "2," "3," "4," etc., that appear above correspondingly sequential appearances of increment designators 41*a*, 41*b*, 51*a*, 61*a*, 42*a*, 42*b*, 62*a*, 41*c*, 41*d*, 43*a*, 53*a*, 41*e*, 41*f*, 41*g*, 61*g*, 41*h*, 41*i*, 51*b*, 61*c*, 42*c*, 42*d*, 62*b*, 41*j*, 41*k*, 43*b*, and 41*m* and are included in the preferred embodiment of an apparatus which employs the notating system in schematic form. The use of such indicia, however, may be eliminated, such as when employing the notating means through the instrumentality of certain electronically-based devices, such as a computer. In the absence of such indicia, however, a substitute referencing means should be employed for referencing a given increment designator. Such means for referencing a given increment designator or other notational symbol include, but are not limited to, the use of electronic means to effect intermittent flashing, an arrow, or enlargement.

The schematic of FIG. 5 is illustrative of schematics designed for employing the notating means. Each such schematic may be used by a person with or without an accompanying performance of a target composition which it describes. In each instance, however, a suitable explanation and legend generally are provided for enabling a user of a schematic to effectively and efficiently utilize the schematic. When used without such an audible performance, each such schematic serves as an instructional aid and may be advantageously employed for various reasons, such as:

identifying the overall architectural structure of the work;

comparing the structural differences between like music composition formats from the same composer;

comparing the structural differences between similar music formats by different composers;

comparing structural differences between similar musical formats from different periods in music history;

memorizing the structural outline of music to be listened to sometime in the future.

Furthermore, the use of reference indicia over the increment designators cues music listeners to the beginning of each melodic increment and allows instructors and learners to clearly identify any given increment(s) being referred to when asking a question or when providing some explanation.

In the schematic of FIG. 5 each notational symbol categorized as an increment designator is used both for representing a given melodic increment within the model composition as well as for representing its formal description. To be noted, however, is that just as book editors have differing opinions as to where certain paragraphs should end or begin, so too may those versed in the art have differing opinions as to where one increment begins and another ends. Thus, the number of increments shown in the schematic of FIG. 5 may have differed had the schematic been prepared by another expert. However, although experts may differ in opinion as to which data to describe and how to divide and categorize certain increments in a target composition, any such differences are irrelevant insofar as the method of using the invention.

Referring now to FIG. 6, the use of a notating system according to the present invention during an audible performance of music is shown schematically. An inaudible signal communicates information to a receiver-monitor 83 so that a user knows what designator corresponds to the music being played at a particular time. If the schematic of FIG. 5 is considered a visual display, the receiver-monitor 83 may be part of the same display or may be a secondary display. The source of the inaudible signal depends on whether the audible performance is live or pre-recorded. A pre-recording of a performance includes a plurality of inaudible signals. During a live performance, a musical expert who is thoroughly acquainted with the composition being performed could manually activate each electronic signal at the appropriate time.

The receiver-monitor 83 apparatus is designed and constructed according to currently available technology and incorporates electronic means for receiving, decoding, and/or transmitting such signals as required for effecting a predetermined visual image on a display, monitor, or screen. Each such image is a standard reference indicium. In this disclosure, each of the plurality of such indicia is represented by indicium 84 in FIG. 5 or 80 in FIG. 6.

FIG. 6 shows an audible performance of a target composition 81 during which an inaudible signal 82 is employed at the beginning of a given increment for effecting a visual appearance on receiver-monitor 83 of given reference indicium 80. The signal may be sent by a triggering device. The means by which inaudible signaling means are activated depends on whether the source of a given presentation is a recording of a target composition or a live performance of it. In a recording, inaudible signals would be electronically embedded during the process of manufacture so as to have a signal activated at the moment each musical increment of th at composition begins. During a live performance each signal may be manually triggered in order to indicate the beginning moment of each musical increment of that target composition. Whether electronically embedded or triggered manually, each signal is used in conjunction with a receiver-monitor 83 capable of receiving each signal and effecting a predetermined indicium 80 on its display. Each indicium 80 appearing on the display 83 corresponds with a like reference indicium 84 printed on a schematic such as shown in FIG. 5.

The use of such a schematic (a) while listening to an audible performance of a composition and (b) in conjunction with the use of an apparatus for displaying a reference indicium at the moment the music belonging to a given increment begins, enables the listener to readily determine the description of each musical increment and of each special section as they occur by a method comprising:

in advance of listening to a target composition, learning the signification assigned to each notational symbol;

paying close attention to the appearance of each sequentially-ordered indicium immediately appearing on a receiver-monitor;

at the moment a given indicium appears on a receiver-monitor, locating the corresponding indicium on the schematic;

recalling the signification assigned to the notational symbol so referenced.

Although the description above contains many specificities, these should not be construed as limiting the scope of the invention, but rather to provide illustrations of some of the presently preferred embodiments of this invention. For example, any simple solitary image used as a visual indicator for representing a discrete datum descriptive of composed music can have some other geometric shape, different linear orientation, or other obvious distinguishing feature, such as color. Also, the composite designators may include more than two visual indicators, if desired. The essential method for using a given composite image for representing a plurality of descriptors for a given melodic increment or special section, however, should remain the same. That is, the description assigned to a given simple solitary image that is included in a composite solitary image should remain the same throughout a given piece of music.

In this disclosure a generic property specified as a logical basis for classifying a plurality of simple solitary images as members of a given class of images is designated as a visual indicator. Likewise, each of the plurality of types belonging to a given class of images is also designated as a visual indicator. Each visual indicator is assigned for representing some musical datum.

In this disclosure the aforementioned simple and composite solitary images are merely illustrative of the designs of the notational symbols used in the present invention for representing various data descriptive of composed music. Also, in regard to the visual indicators used in the present invention, it is to be understood that the classes of solitary images are arbitrarily chosen; the types of solitary images belonging to a given class are arbitrarily chosen; the meaning signified by each class of solitary image are arbitrarily assigned; and the meaning signified to each member, or type, of image belonging to a given class are arbitrarily assigned. Therefore, the particular solitary images and their particular signification as used in this disclosure is to be considered as illustrative of the system used for choosing notational symbols and for assigning a predetermined signification to each rather than as a definitive identification of the notational symbols to be used and the meanings to be assigned to each. Also, the positioning and arrangement of the designators could be changed. As just one alternative example, the horizontal bars 70–73 could be replaced with shading surrounding the composite designators to which they correspond.

Furthermore, the present invention takes into account the various limitations imposed by a given medium used to receive and display the visual indicators used for representing whatever data are being identified. In each instance of the use of the notating means of the present invention, the choice of solitary images used for representing a given datum among the plurality of data targeted for identification is limited to the chosen medium's capacity for receiving and displaying images. Preferred embodiments of the present invention are made manifest on paper and through the instrumentation of highly sophisticated electronic media such as televisions and monitors used with computers because of their highly versatile capacity for receiving and displaying visual images. Using the aforementioned method for choosing individual visual indicators, however, enables a musicologist to devise solitary images appropriate for representing select musical data through the instrumentation of electronic devices with limited capacity for displaying graphic configurations, colors and sizes of individual images, and number of lines of images able to be displayed concurrently.

GLOSSARY

To prevent confusion, the following glossary defines some of the terms used in this specification.

architectonic adj. in musical composition, a group of melodic increments which belong together.

closing section n. 1. in musical subject matter, a unified series of concluding statements of an exposition or recapitulation. 2. in musical architecture, that combination of sequential INCREMENTS whose subject matter presents the concluding statements of an exposition or recapitulation.

coda n. see FINALE.

composite solitary image n. a kind of SOLITARY IMAGE composed of a combination of two or more types of DISCRETE VISUAL INDICATORS.

datum n. any of the smallest meaningful units of information symbolically represented by any DISCRETE VISUAL INDICATOR employed in the notating means of the present invention.

data n. any information comprising more than one DATUM and signified by a COMPOSITE NOTATING SYMBOL employed in the notating means of the present invention. Examples of data are: part one (one DATUM) of theme one (another DATUM); part two (one DATUM) of theme one (another DATUM); a TRANSITION (one DATUM) featuring theme one (integrally-related DATA, i.e., theme and one).

designator n. a graphic notational symbol used to denote a formal verbal description of a MELODIC INCREMENT.

development n. The second major division of a three-part formally structured composition. Also, development section.

discrete visual indicator n. in a SOLITARY IMAGE, any prespecified visual property or feature predesignated as representing some specific DATUM or integrally-related DATA according to the present invention. The predesignated property or feature may be: (a) a similar characteristic logically used for categorizing a plurality of solitary images as a class, such as hatching or geometric outline, or (b) a differentiating characteristic used for categorizing a member of a given class as a given type.

exposition n. 1. The first major division of a formally structured composition.

Also, exposition section.

finale n. 1. in musical architecture, the last linear area of either a formally structured composition or of a composition requiring a formal section to bring the music to a close. 2. in musical subject matter, the concluding statements of the entirety of a composition. A finale may also be composed of one or more INCREMENTS. Also, coda.

increment n. 1. in musical architecture, a passage, or block, of music treated as a single formal component of a major section of a formally structured composition. 2. in musical subject matter, the tonal content presented in a series of compositionally unified measures embodied in an architectural increment. Also, melodic increment. A given melodic increment is generally categorized according to its relative position within a composition. Most increments are referred to by a combination of a theme number and part number, e.g., theme one, part one; theme one, part two.

See also, TRANSITION and FINALE.

increment designator n. a COMPOSITE SOLITARY IMAGE used as a NOTATIONAL SYMBOL for representing an INCREMENT within a musical composition. In this disclosure each increment designator manifests a type of hatching and a type of geometric outline.

linear area n. 1. in musical architecture, any major subdivision of any major section of a formally constructed composition. In a schematic presentation using the present invention, and according to the target composition, a linear area includes one or more INCREMENT DESIGNATORS and, if appropriate, a NOTATIONAL SYMBOL such as an underscoring for denoting that the INCREMENT DESIGNATOR(S) belong to a particular special section. 2. in musical subject matter, the sequentially occurring musical content presented in those measures that make up any major subdivision of any major section of a formally constructed composition. According to the target composition, the subject matter included in a given linear area may be presented within one or more INCREMENT.

melodic increment n. a formal expression of tonalities which affect a complete or partial melody (also Unit/ also single mel. iner.).

melody n. a succession of tones varying in pitch which have an organized shape (musical notation) and a recognizable sound (melody).

model composition n. herein, Mozart's Symphony No. 40 in g minor, First Movement; the musical composition often referred to in this disclosure for illustrating select aspects of the present invention.

musical sections n. (major section. subsection) major and subordinate divisions (sections) in music composition which imply the use of specific artistic disciplines in the formation of the work.

Major Sections

Exposition: presentation of themes; plus a closing section to end this division of music Development: development of selected material from the Exposition Recapitulation: Re-presentation of themes; plus a closing section and/or a coda (finale)

Subordinate Sections

Introduction: usually before the Exposition

Closing: usually in the Exposition after the presentation of themes and in the recap Coda (Finale): the final closing section of a work musical subject (THEME) n. a basic element in music construction containing one or more dependent melodies. A symphonic movement may include one or more subjects (themes) each of which may be composed of one or more dependent melodies.

notational symbol n. any SOLITARY IMAGE having one or more of its visual characteristics, properties, or features designated as representing some specific DATUM or integrally-related DATA descriptive of composed music.

recapitulation n. The final major division of a formally structured composition.

Also, recapitulation section.

simple solitary image n. a kind of SOLITARY IMAGE of whose visual properties no more than one is designated for representing a class of images and no more than one is designated for representing a type of image. A simple solitary image, therefore, may have either one or two *DISCRETE VISUAL INDICATORS*. See also, *NOTATIONAL SYMBOL*.

solitary image n. any apparent mark(s) or color(s), or combination thereof, appearing as a logically unified and distinct visual impression. See also, SIMPLE SOLITARY IMAGE and COMPOSITE SOLITARY IMAGE.

sonata allegro n. a three-art musical form whose major divisions include an EXPOSITION section, a DEVELOP- MENT section, and a RECAPITULATION section. The form of the model composition referred to in this disclosure is classified as sonata allegro.

target composition n. any musical composition selected for description by the present invention.

theme n. a complete musical subject with one or more melodies.

transition n. in musical architecture, an INCREMENT serving as a connecting passage between two melodies, each occurring with a given LINEAR AREA or in separate but sequential LINEAR AREAS of a composition. Also, transitional passage. The musical content of a transition usually features musical subject matter related to that presented in one or more immediately preceding musical increments.

underscoring n. any of various horizontal bars appearing beneath some INCREMENT DESIGNATOR(S) and used for denoting such increment(s) as belonging to a special section, viz., closing section, exposition, or finale.

visual indicator n. a specific visual property manifested by a SOLITARY IMAGE and used symbolically for representing some predetermined DATUM or integrally-related DATA.

What is claimed is:

1. A visual display for graphically symbolizing melodic increments of composed music, said visual display comprising:
    a plurality of composite designators each representing a melodic increment of a musical composition, each designator comprising;
        a first visual indicator selected from a first class of visual images, each member of said first class corresponding to a different theme of said musical composition; and
        a second visual indicator selected from a second class of visual images, each member of said second class corresponding to an ordering;
    wherein each composite designator represents a melodic increment having a specific theme and ordering.

2. The visual display of claim 1, wherein one of said classes of visual images comprises patterns.

3. The visual display of claim 2, wherein said patterns are hatchings.

4. The visual display of claim 1, wherein one of said classes of visual images comprises geometric outlines.

5. The visual display of claim 1, wherein one of said classes of visual images comprises colors.

6. The visual display of claim 1, wherein said plurality of composite designators are displayed in a sequence corresponding to a sequence of melodic increments of said musical composition.

7. The visual display of claim 1, wherein said plurality of composite designators are grouped into architectonic rows.

8. The visual display of claim 1, further including a plurality of section designators, each section designator corresponding to a section of the musical composition.

9. The visual display of claim 8, wherein each section designator is associated with one or more successive ones of said composite designators.

10. The visual display of claim 1, further comprising a plurality of index numerals, one of said index numerals corresponding to each of said composite designators.

11. The visual display of claim 10, wherein said plurality of composite designators are displayed in a sequence corresponding to a sequence of melodic increments of said musical composition.

12. The visual display of claim 10, further comprising a secondary display for displaying said index numerals when the melodic increment corresponding to the composite designator corresponding to the index numeral is being played.

13. The visual display of claim 12, further comprising a triggering device in communication with said secondary display for causing said secondary display to display particular one of said index numerals.

14. The visual display of claim 1, wherein said visual display further comprises an electronic display device with said composite designators appearing thereon.

15. The visual display of claim 1, wherein said visual display further comprises a printed medium with said composite designators appearing thereon.

16. A method for providing a graphical representation of a sequence of melodic increments of a musical composition, said method comprising:
    a. providing a visual display for graphically symbolizing melodic increments of composed music, said visual display comprising a plurality of composite designators each representing a melodic increment of a musical composition, each designator comprising; a first visual indicator selected from a first class of visual images, each member of said first class corresponding to a different theme of said musical composition; and a second visual indicator selected from a second class of images, each member of said second class corresponding to an ordering, wherein each composite designator represents a melodic increment having a specific theme and ordering; and
    b. arranging said composite designators in a sequence corresponding to the sequence of melodic increments in the musical composition.

17. A notating system for graphically symbolizing melodic increments of composed music, said notating system comprising:
    a plurality of composite designators each representing a melodic increment of a musical composition, each designator comprising;
        a first visual indicator selected from a first class of visual images, each member of said first class corresponding to a different characteristic of said musical composition; and
        a second visual indicator selected from a second class of visual images, each member of said second class corresponding to an ordering;
    wherein each composite designator represents a melodic increment having a specific characteristic and ordering.

18. The notating system of claim 17, wherein said plurality of composite designators are displayed in a sequence corresponding to a sequence of melodic increments of said musical composition.

19. The notating system of claim 17, further including a plurality of section designators, each section designator corresponding to a section of the musical composition.

20. The notating system of claim 19, wherein each section designator is associated with one or more successive ones of said composite designators.

21. The notating system of claim 17, wherein said plurality of composite designators are displayed in a sequence corresponding to a sequence of melodic increments of said musical composition, said notating system further comprising a plurality of index numerals, one of said index numerals corresponding to each of said composite designators.

* * * * *